Feb. 28, 1967     H. F. FOGLEMAN     3,307,042
SWITCHING DEVICE
Filed April 30, 1962
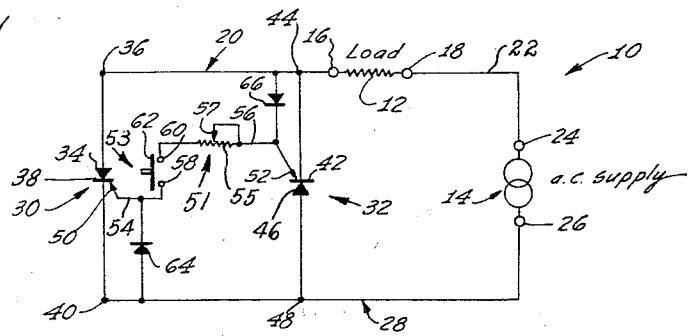
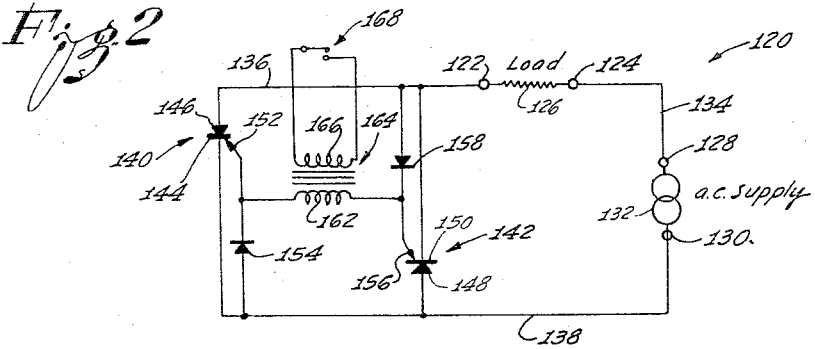
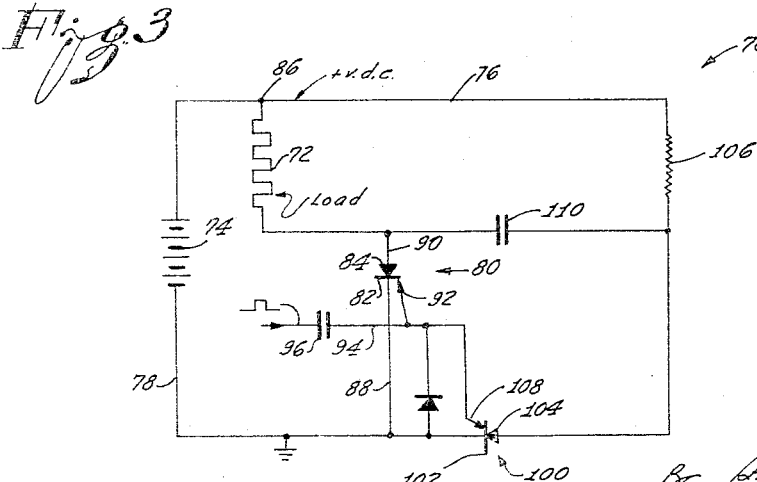
INVENTOR
Harry F. Fogleman
Attorneys United States Patent Office 3,307,042
Patented Feb. 28, 1967

3,307,042
SWITCHING DEVICE
Harry F. Fogleman, San Diego, Calif., assignor to Aeromarine Electronics, Inc., San Diego, Calif., a corporation of California
Filed Apr. 30, 1962, Ser. No. 190,910
2 Claims. (Cl. 307—88.5)

The present invention relates to control means and more particularly to an electrical circuit for controlling the operation of an electrical load.

Where an electrical load obtains its power from an electrical power source it is desirable to provide a switch for connecting and disconnecting the load from the source and/or control means for regulating the flow of power to the load. Although there are numerous systems for effectively controlling an electrical load, more recently it has been proposed to provide control circuits employing semiconductive devices. Some of the most successful types of circuit are those employing so-called silicon controlled rectifiers. Such rectifiers consist of four layers of alternate conductivity separated by three semiconductive junctions. The two end layers form a cathode and an anode between which a current may flow while one of the intermediate layers forms a gate that is effective to control the flow. Normally such a rectifier is nonconductive until a current of some predetermined amount flows through the gate. The rectifier then "fires" and becomes fully conductive such that a load current may continue to flow therethrough until it is somehow subsequently shut off. Although such circuits have been capable of switching a load on and off they have been incapable of smoothly varying the power supplied to the load throughout a range. In addition, they have required complex pulse shaping circuits, etc. for producing the gate current. This has resulted in circuits that are not only unnecessarily heavy, bulky and expensive but are also unreliable and subject to excessive heat rises.

It is now proposed to provide a control circuit that will overcome the foregoing difficulties. More particularly it is proposed to provide a control circuit that is very simple, reliable and efficient and will accurately control the flow of power to a load. This is to be accomplished by providing a control circuit having a pair of silicon controlled rectifier elements that are arranged to be in series with a power source and a load so as to control the load current. The means for controlling the current in the gate portion of the circuit is effective to insure the rectifier becoming conductive without necessitating any pulse shaping networks but at the same time will insure a flow of a minimum amount of current in the gate whereby the heating of the rectifiers will be reduced to a minimum. No resistive components with resultant power dissipation are required.

These and other features and advantages of the present invention will become apparent from reading the following detailed description of two embodiments of the invention, particularly when taken in connection with the accompanying drawings wherein like reference numerals refer to like parts, and wherein:

FIG. 1 is a wiring diagram of a control means embodying one form of the invention; and FIG. 2 is a wiring diagram of a control means embodying a second form of the invention.

FIG. 3 is a wiring diagram of a control means embodying a third form of the invention.

Referring to the drawings in more detail and particularly to the wiring diagram in FIG. 1 thereof, the present invention is embodied in a solid state switching or control circuit 10 for controlling the interconnection of an electrical load 12 with an alternating current source 14 for energizing the load 12.

The load 12 may be of any desired variety and magnitude depending on the ratings of the components in the circuit 10. However, by way of example, for components presently readily available, the load 12 may draw a current that varies throughout a range on the order of a few milliamperes to over several hundred amperes. The power source 14, of course, must be compatible with the load 12. However, it has been found that it may have a voltage that ranges from about 3 volts to in excess of 50,000 volts with a freqeuncy that extends from a fraction of a cycle per second to more than 50 kilocycles per second.

The switching circuit 10 includes a pair of output terminals 16 and 18 that are adapted to be interconnected with the electrical load 12. One of these terminals 16 has an output conductor 20 interconnected therewith while the other terminal 18 is interconnected with one end of a linking conductor 22.

A pair of input terminals 24 and 26 are also provided that are adapted to be operatively interconnected with a suitable alternating power source such as an alternator, etc. One of the terminals 24 is interconnected with the second end of the linking conductor 22 whereby the input terminal 24 will be directly connected to the output terminal 18. The other of the output terminals 26 is interconnected with an input conductor 28. It may thus be seen that load 12 and the supply 14 will be electrically connected in series with each other and with the remainder of the switching circuit 10.

The circuit also includes a pair of substantially identical rectifier elements 30 and 32. Although these rectifier elements 30 and 32 may be of any suitable variety they are preferably semiconductor devices such as silicon controlled rectifiers. Rectifiers of this nature are readily available from a wide variety of sources and their structure and operation is well known. Very briefly they are solid state devices composed of four layers of alternate conductivity separated by three junctions commonly designated $J_1$, $J_2$, and $J_3$. The layer on one end of the device forms a cathode while the layer at the other end forms an anode. One of the intermediate layers forms a gate for controlling the flow of current between the cathode and anode. Although an electron flow may exist from the cathode to the anode it will normally be "blocked" until a suitable triggering signal is applied to the gate. Once the triggering signal has been applied to the gate it will cause the rectifier to "fire," and the current will continue to flow until it is shut off by, for example, reducing the current below a minimum or cutoff level.

The first rectifier element 30 has the anode 34 thereof connected directly to the output conductor 20 at the junction 36. The cathode 38 is in turn connected directly to the input conductor 28 at the function 40. The second rectifier element 32 has the cathode 42 thereof connected directly to the output conductor 20 at the junction 44 while the anode 46 is connected to the input conductor 28 at the junction 48. It may be seen that if the two rectifier elements 30 and 32 are disposed in an opposed polarity relationship such that if they are maintained in conductive states, during one half cycle current will flow through rectifier element 30 and during the other half of the cycle current will flow through the other rectifier element 32.

The gates 50 and 52 of the two rectifier elements 30 and 32 may respectively have conductors 54 and 56 interconnected therewith and leading to a control network 51. This network 51 may be any desired variety but in the present instance it includes a so-called mechanical make and break switch 53 and a variable resistor 55. The switch 53 includes a pair of isolated fixed contacts 58 and 60 and a movable contact 62 that can be moved into and out of engagement with the fixed contacts 58 and 60. The first conductor 54 extends from the gate 50 to the first contact 58 while the second conductor 56 extends from the second gate 52 to the second fixed contact 60. The resistor 55 includes a movable contact 57 that may be moved axially along the resistor 55 so that the effective resistance may be varied between some predetermined maximum amount and zero.

It may thus be seen that when the switch contacts 58 and 60 are open only the leakage currents through the silicon controlled rectifiers 30 and 32 will flow through the load 12. This leakage current will normally be very small compared to normal load current and accordingly the load will not be energized. In order to energize the load 12, the movable contact 62 is merely moved against the fixed contacts 58 and 60. This will result in the two gates 50 and 52 being electrically connected together. If the voltage from the supply 14 is just passing through zero, there will be no current flow at that instant. However, assuming the voltage is entering a positive swing substantially the supply voltage will be present on the gate 52. When the voltage on the gate 50 exceeds the forward voltage across the junction (for example on the order of 1 or 2 volts) a current will flow between the gate 50 and conductor 20 through the conductors 54 and 56, contacts 58 to 60, resistor 55, and into the gate 52. As the voltage continues to increase the current will increase until the forward current in the gate 50 is large enough to cause the element 30 to "break down" or "fire" such that the current will flow through the element from the anode 34 to the cathode 38. In the event the leakage current is inadequate to produce such a breaking down or firing diodes 64 and 66 may be provided in parallel to the leak paths for the gates 50 and 52.

The setting of the resistor 55 will of course determine the level to which the supply voltage must rise before the rectifier will fire. As the resistance increases, the greater the voltage must be and therefore the rectifier will conduct a shorter portion of the cycle and the load 12 will receive less power from the source 14. In the event it is desired to merely switch the load on and off without limiting the power flow the resistor 55 may be completely eliminated.

Once the rectifier element 30 has become conductive, the voltage drop thereacross will be less than the forward voltage required to produce a leakage current through the gate 52 (and the diode 66, if present). As a result the current in the gate will instantly cease to flow and all of the current will flow through the rectifier element 30 and the load 12.

When the polarity across the source 14 reverses, the recifier 30 will become nonconductive. However, a leakage current will then flow forwardly through the gate 50 (and diode 64, if present), the conductors 54 and 56, through the resistor 55, the switch 53 and through the gate 52. This current will then increase until the "breakdown" or "firing" level is reached. The rectifier element 32 will then permit the full current to flow from the anode 46 to the cathode 42.

It is of course apparent that as long as the contacts 58, 60 and 62 are all closed each time the polarity of the supply changes, a pulse of current will flow across the conductors 54 and 56 to "fire" one or the other of the rectifier elements 30 or 32. As soon as one of the rectifier elements becomes conductive, the voltage drop thereacross will become so low that no leakage current can flow through the gates 50 or 52. Since the time interval required to cause breakdown to occur is on the order of microseconds and the amount of current is in a milliampere range, the power flowing through the contacts 58, 60 and 62 and the gates 50 and 52 will be very small compared to power flowing through the load. In addition, since the firing of the silicon rectifiers 30 and 32 will insure the extinguishing of the gating current no complex trigger or pulse circuits are required.

As a consequence, it may be seen that an efficient switching and/or control circuit 10 has been provided for regulating a load 12. The opening and closing of the contacts will effectively turn on and off large amounts of power without overloading the switch contacts. Similarly, the resistance 55 may be varied throughout its range so as to control the load with the expenditure of a minimum amount of power in the resistor 55.

When it is desired to provide an even greater amount of isolation between a load and the input switching circuiting the embodiment 120 of FIGURE 2 may be employed. This embodiment 120 is similar to the switching circuit 10 of FIGURE 1 in that it also includes a pair of output terminals 122 and 124 that may be connected to a suitable electrical load 126 and a pair of output terminals 128 and 130 that may be connected to a source 132 of A.C. power. The input terminal 128 and the output terminal 124 are connected together by a conductor 134. The output terminal 122 and the input terminal 130 have conductors 136 and 138 respectively connected thereto.

A pair of silicon controlled rectifier elements 140 and 142 may be provided that are substantially identical to the rectifiers 30 and 32 in the first embodiment. More particularly the first rectifier 140 has the cathode 144 thereof connected to the conductor 138 and the anode 146 connected to the conductor 136. Conversely the rectifier 142 has the anode 148 connected to the conductor 138 and the cathode 150 connected to the conductor 136. As a consequence it may be seen that the two rectifiers 140 and 142 may be alternatively conductive whereby the entire A.C. power may flow through the rectifiers during alternate half cycles.

The gate 152 of the first rectifier 140 is connected to a diode 154 that extends to the conductor 138 and the gate 156 may be connected to a diode 158 that is connected to the conductor 136. In addition the two gates 152 and 156 may be connected to the opposite ends of a secondary winding 162 of an iron core transformer 164. The primary winding 166 has the opposite ends thereof connected to a single pole-single throw switch 168 so as to effectively form a short circuit for the primary winding 166.

During operation of the embodiment of FIGURE 2 the switch 168 will initially be open and a completed circuit will not be formed through the primary 166. As a result the impedance of the secondary winding 162 will be sufficiently high to prevent the current in either gate 152 or 156 reaching a sufficient magnitude to permit the rectifiers 140 and 142 to become conductive and the load 132 will be effectively disconnected from the source 132. However, as soon as the switch 168 closes so as to short out the primary winding 166 the impedance of the secondary 162 will be decreased so that it will permit the rectifiers 140 and 142 to become conductive. It may thus be seen that this switching circuit will be effective to provide a distinct bistable operation with a high isolation between the control input and output switching circuitry.

As a further alternative, the solid state switching and/or control circuit 70 of FIG. 3 may be employed for controlling the interconnection of an electrical load 72 with a direct current power source 74 having a conductor 76 extending from the positive side thereof. The load 72 may be connected to the conductor 76 by means of a junction 86. A negative or ground conductor 78 extends from the opposite or negative side of the source 74.

A silicon controlled rectifier element 80 similar to the elements 30 or 32 in the first embodiment may be provided. The cathode 82 of this element 80 is connected to the grounded or negative conductor 78 by a lead 88. The anode 84 is connected to the end of the load 72 by means of a lead 90.

The gate 92 of the rectifier 80 may be connected to a conductor 94 that leads to one side of a coupling condenser 96. The opposite side of the condenser 96 may be connected to a triggering circuit that will provide a pulse suitable for "firing" the rectifier element 80. Characteristically, this circuit will provide a pulse on the order of from 1 to 10 volts with a time duration in excess of a minimum interval such as 5 microseconds.

It may be seen that if the triggering circuit supplies a suitable pulse, it will be coupled across the condenser 96 to the gates 92 and 108, the silicon controlled rectifier 80 will be placed in a conductive state and a direct current may flow from the anode 84 to the cathode 82 and circulate around the loop formed by the load 72, the source 74, and the rectifier 80.

In order to place the rectifier element 80 in a blocking condition, a second silicon controlled rectifying element 100 may be provided. This element 100 has the cathode 102 thereof connected to ground. The gate 108 of the rectifier 100 is also connected to the conductor 94 leading to the condenser 96. Thus any pulses supplied by the triggering circuit will be simultaneously applied to both of the gates 92 and 108.

The anode 104 is connected to the positive conductor 76 by means of a current limiting resistor 106. This resistor 106 is preferably sufficiently large to limit the current flow through the rectifier 100 to less than the amount required to maintain the rectifier element 100 in a conductive state. Thus even though the triggering circuit may produce a pulse adequate to permit the rectifier 100 to fire the current will be inadequate to keep it in that state. As a result, it may be conductive only momentarily.

A storage condenser 110 may be provided that extends between the anode 84 of the rectifier 80 and the anode 104 of the rectifier 100. When the rectifier element 80 is in a nonconductive state substantially all of the potential of the source 74 will appear across the rectifier 80 and the condenser 110 will accumulate little or no charge. However, when the rectifier 80 is in a conductive state, there will be little or no voltage drop thereacross while substantially the entire source potential will be across the load 72. As a result the condenser 110 will be charged to substantially the same potential as the source 74.

Assuming the circuit 70 is in such a state that the load 72 is shut off and it is desired to turn the load 72 on, the trigger circuit is caused to apply a pulse to the condenser 96. This pulse will be effective to permit a sufficient current to flow through the gate 92 to fire the rectifier 80 and cause it to become conductive. The current may then flow around the loop and energize the load 72. It should be noted that even if the pulse is adequate to fire the rectifier 100, the resistor 106 will limit the current flow such that the rectifier will only be conductive for a short interval.

Assuming that the circuit 70 is conductive, and the load 72 is energized, substantially the entire potential of the source will be present across the load and the condenser 110 will accumulate a charge having a potential of the source. The trigger circuit may then be energized so as to cause a trigger pulse to be applied to the gate 108. This will cause the rectifier to become conductive whereby the condenser may discharge around a loop formed by the rectifier 100 and the rectifier 80. However, this current flow will be in opposition to the load current flow previously present in the rectifier 80. Since substantially the entire potential of the source will be present in this current surge, the current flow in the rectifier will be stopped for a sufficient interval to cause the rectifier to become nonconductive. It may thus be seen that a second pulse from the source will be effective to de-energize the load.

It may therefore be seen that a switching and/or control circuit has been provided that will be effective to regulate the electrical interconnection of a load with a power source. It will be readily apparent to persons skilled in the art that although only a limited number of embodiments have been disclosed numerous changes and modifications may be made thereto without departing from the spirit of the invention. Accordingly, the foregoing drawings and description thereof are for illustrative purposes only and do not in any way limit the invention which is defined only by the claims that follow.

What is claimed is:

1. An electrical circuit for controlling the interconnection of an electrical load with an electrical power source, said circuit including:

a pair of silicon controlled rectifiers, each of said rectifiers having an anode, a cathode and a gate, said gate having a forward voltage below which a gate current will not flow and above which a gate current will flow, said gate current when in excess of a predetermined amount being effective to forward bias the rectifier into conduction with a current flowing from said anode to said cathode, said rectifiers when conductive having a voltage between the anode and cathode that is less than said forward voltage, means connecting the anode and cathode of the first rectifier in series with said load and power source such that current flowing through the load in a first direction will flow from the anode to the cathode of the first rectifier, means for connecting the anode and cathode of the second rectifier in parallel to the first rectifier and in series with said load and power source such that current flowing through the load in a second direction will flow from the anode to the cathode of the second rectifier, and a transformer having a primary winding and a secondary winding, said secondary winding being interconnected with said gates, said primary winding being interconnected with a control element effective to short circuit the primary winding.

2. An electrical circuit for controlling the interconnection of an electrical load wih an alternating electrical power source, said circuit including:

a pair of electrically conductive members serially interconnected with the load and the source, a pair of substanitally identical silicon controlled rectifiers, each of which has an anode, a cathode and a gate, each of said gates having a forward voltage below which a gate current will not flow and above which a gate current will flow, said forward gate current when in excess of a predetermined amount being effective to bias its rectifier conductive so that a current may flow from the anode to the cathode, means interconnecting the rectifiers in parallel opposed relation between the electrically conductive members, said rectifiers when biased conductive having a potential difference between the anode and cathode that is less than said forward voltage to thereby limit the voltage between the electrically conductive members to less than said forward voltage, a transformer having a primary winding and a secondary winding, said secondary winding interconnecting said gates with each other and said forward voltage whenever one of said rectifiers is conducting being free of any bilateral current paths between the anodes and cathodes, said primary winding including means for forming a short circuit across the winding.

References Cited by the Examiner

"Notes on the Application of the Silicon Controlled Rectifier," published by G.E. Semiconductor Products Division, December 1958, page 40, Fig. 9.1.

"Controlled Rectifier Manual," published by Rectifier Components Department of General Electric Co. (1960); pages 45, Fig. 4.4(A), and 82, Fig. 7.1, are relied on.

"Applications and Design Notes," published by Solid State Products, Inc. (Bulletion D420, September 1960); page 8, Figure 5, relied on.

JOHN F. COUCH, *Primary Examiner.*

LLOYD McCOLLUM, *Examiner.*

K. W. HADLAND, H. KATZ, K. D. MOORE,
*Assistant Examiners.*